March 3, 1959 B. H. LOCKE ET AL 2,875,907
APPARATUS FOR LOADING UNITS
Filed July 22, 1954 14 Sheets-Sheet 7

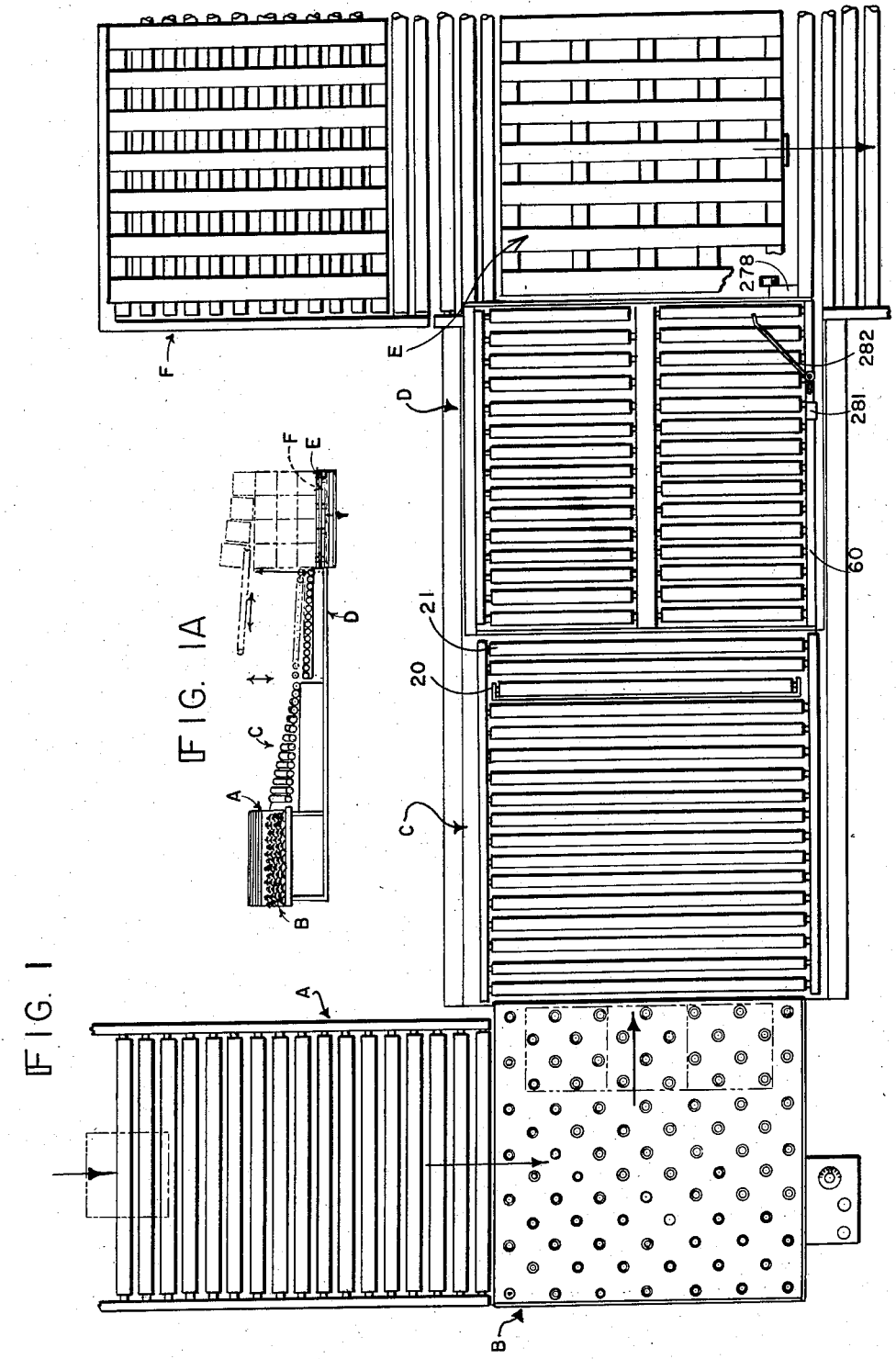

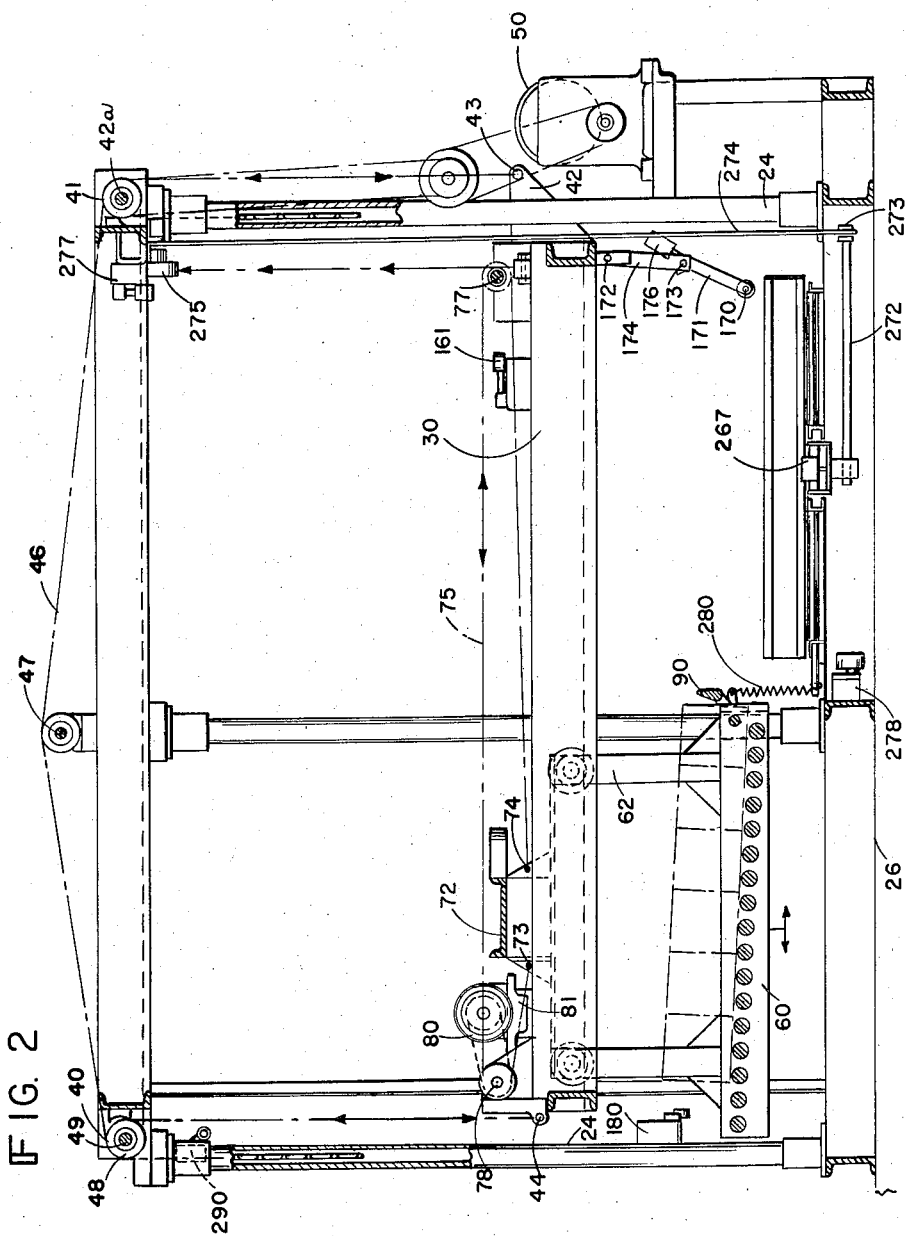

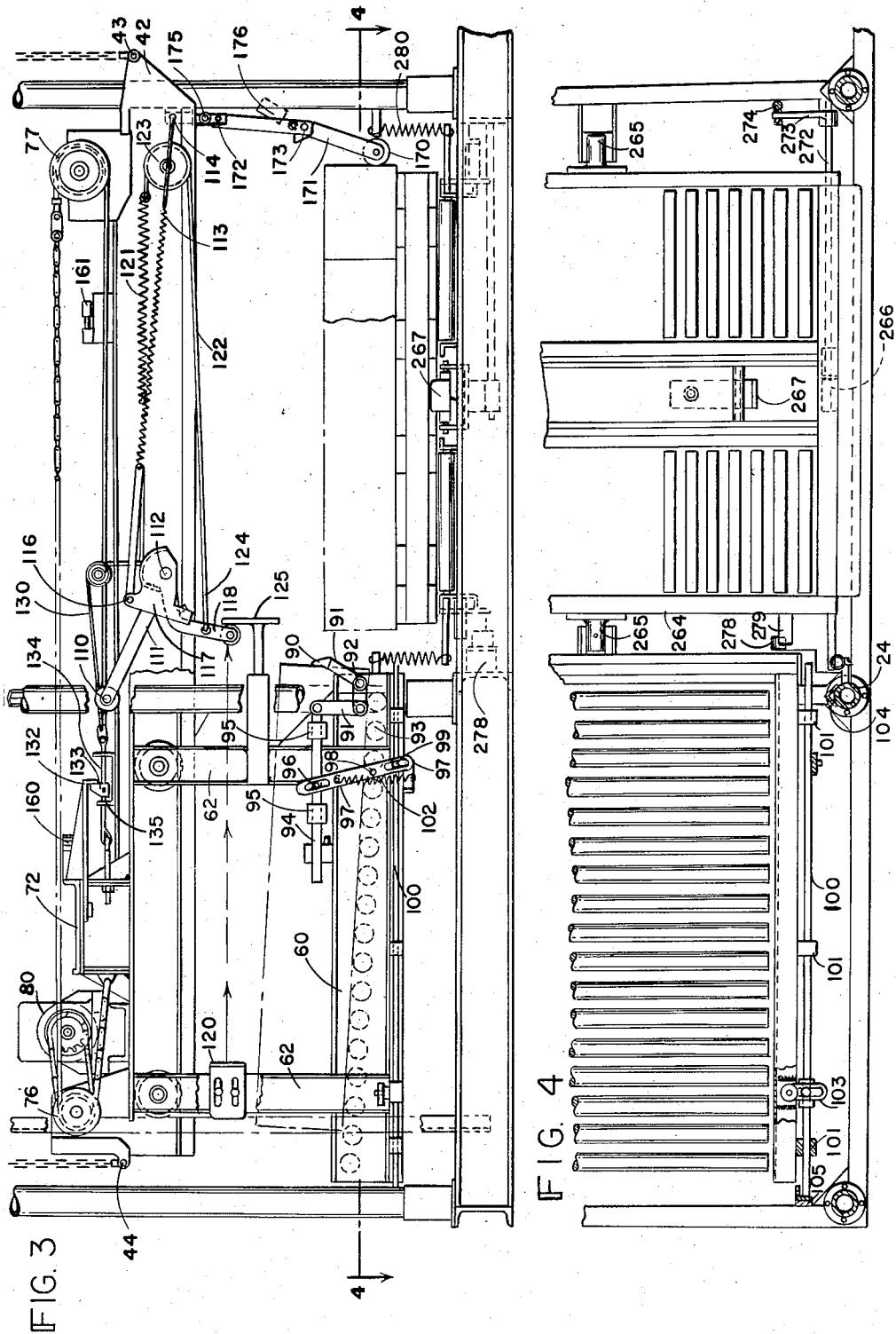

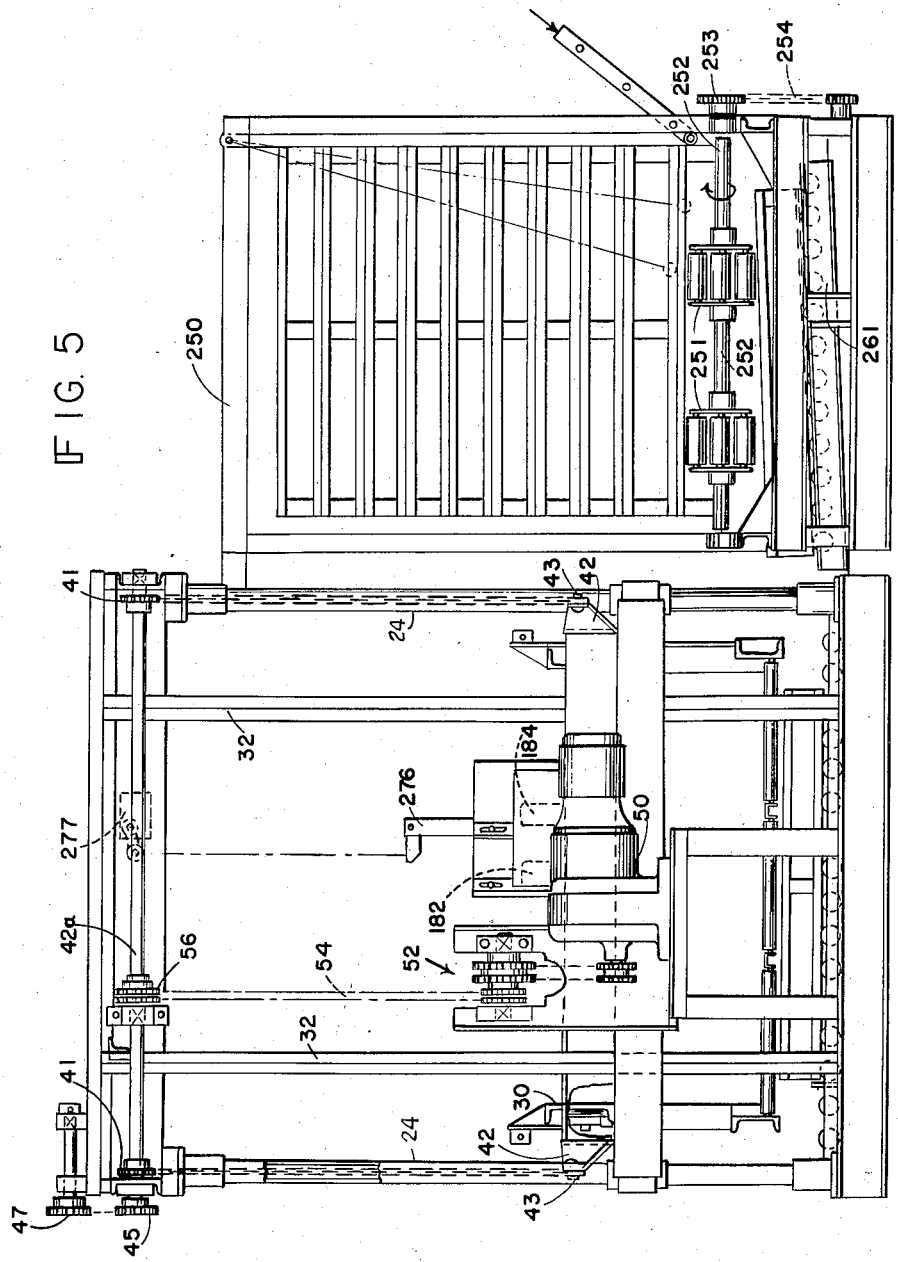

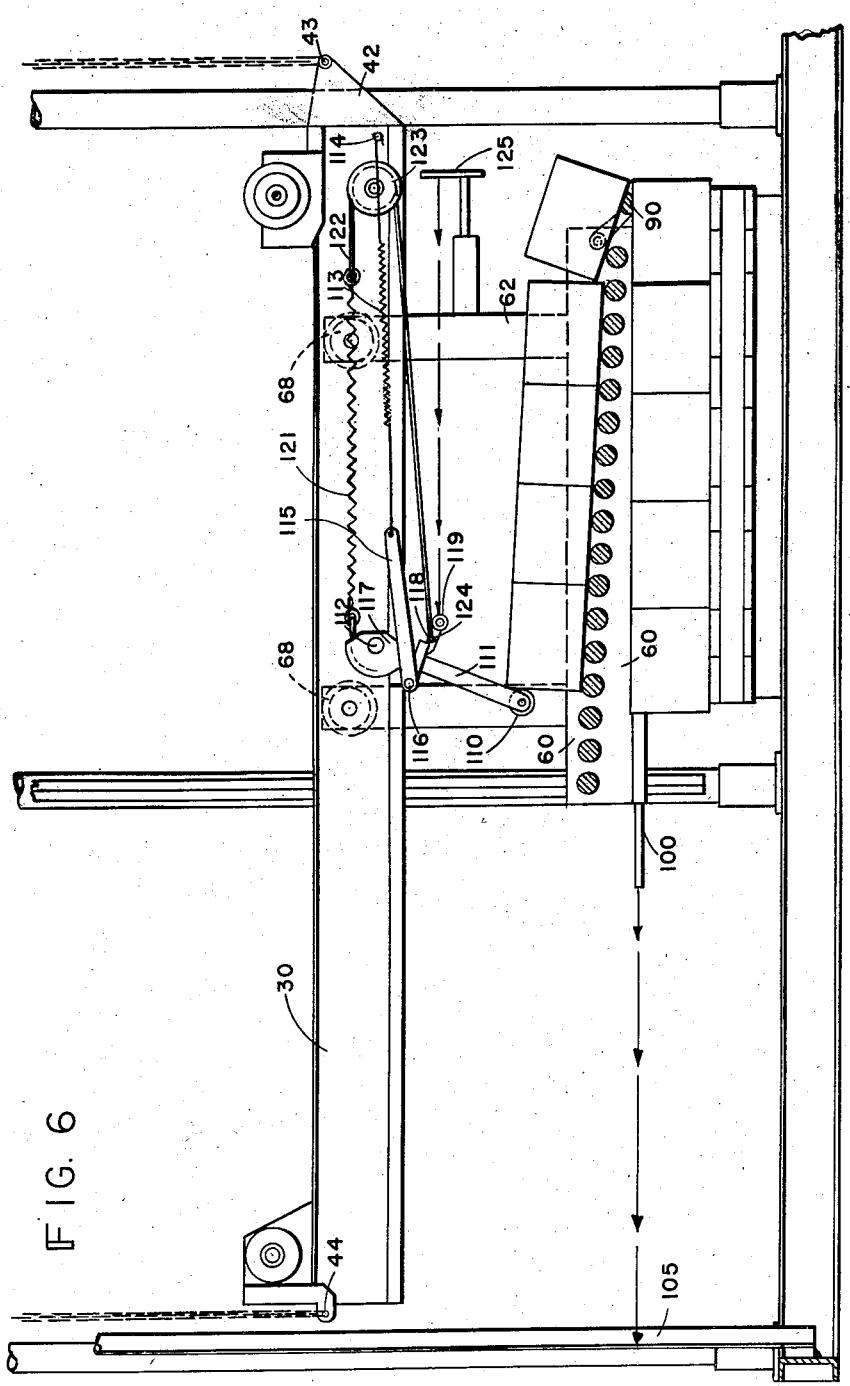

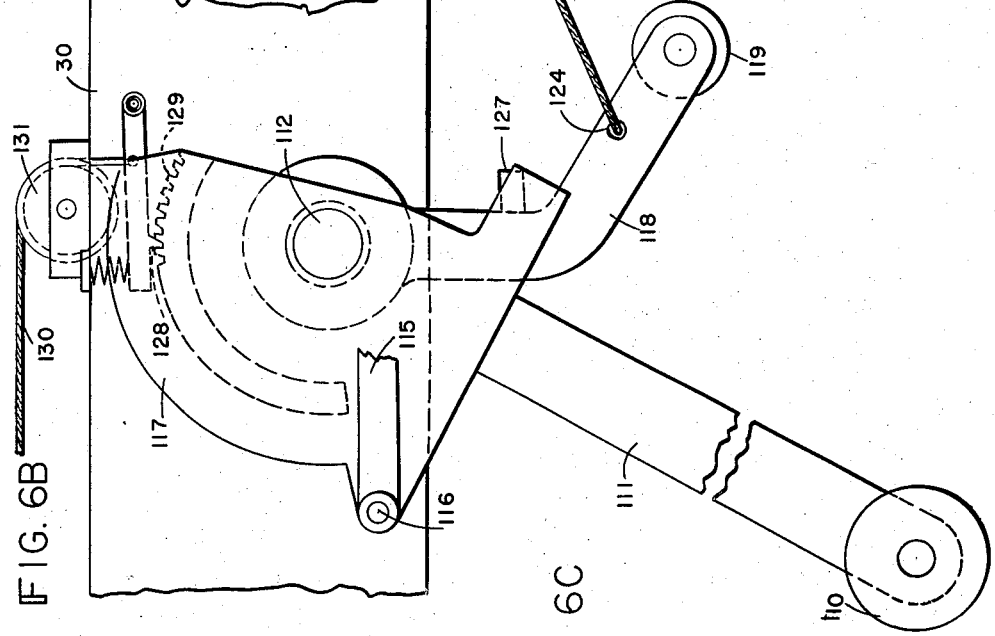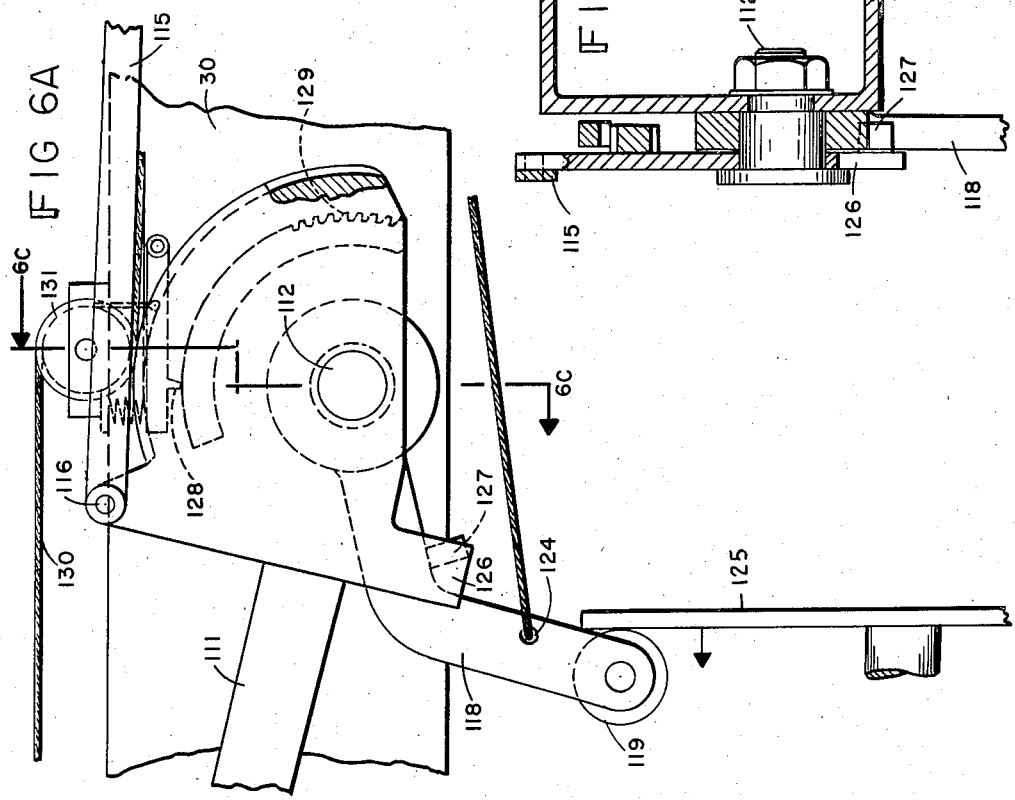

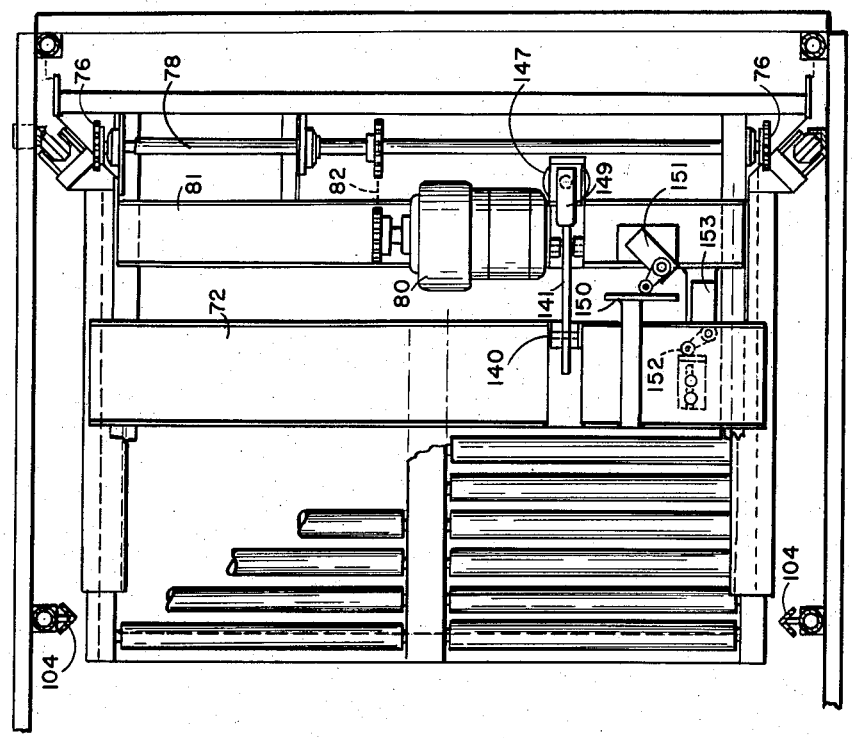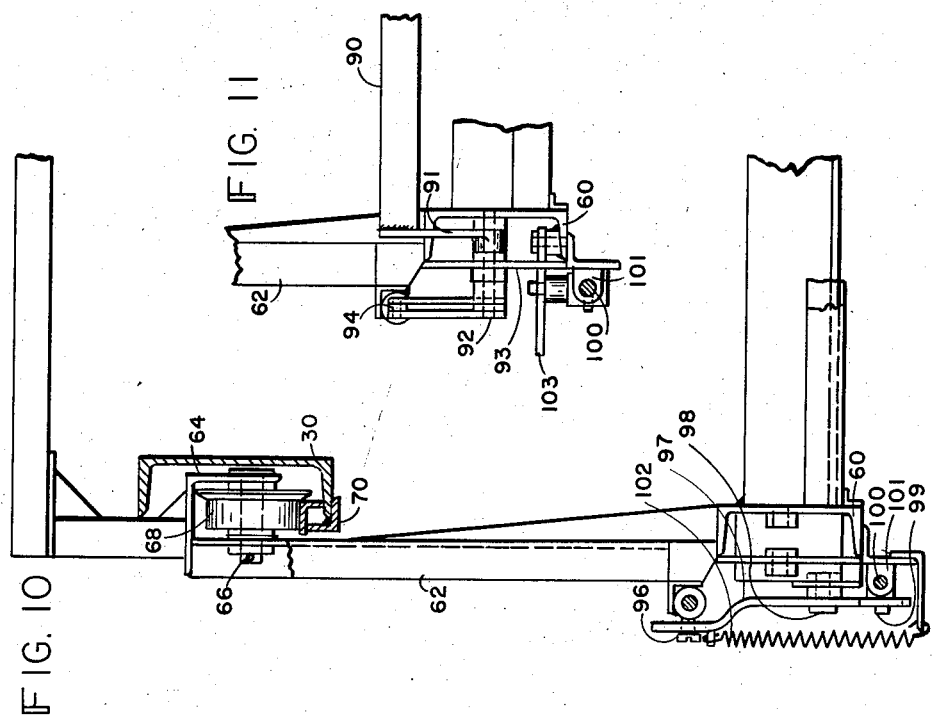

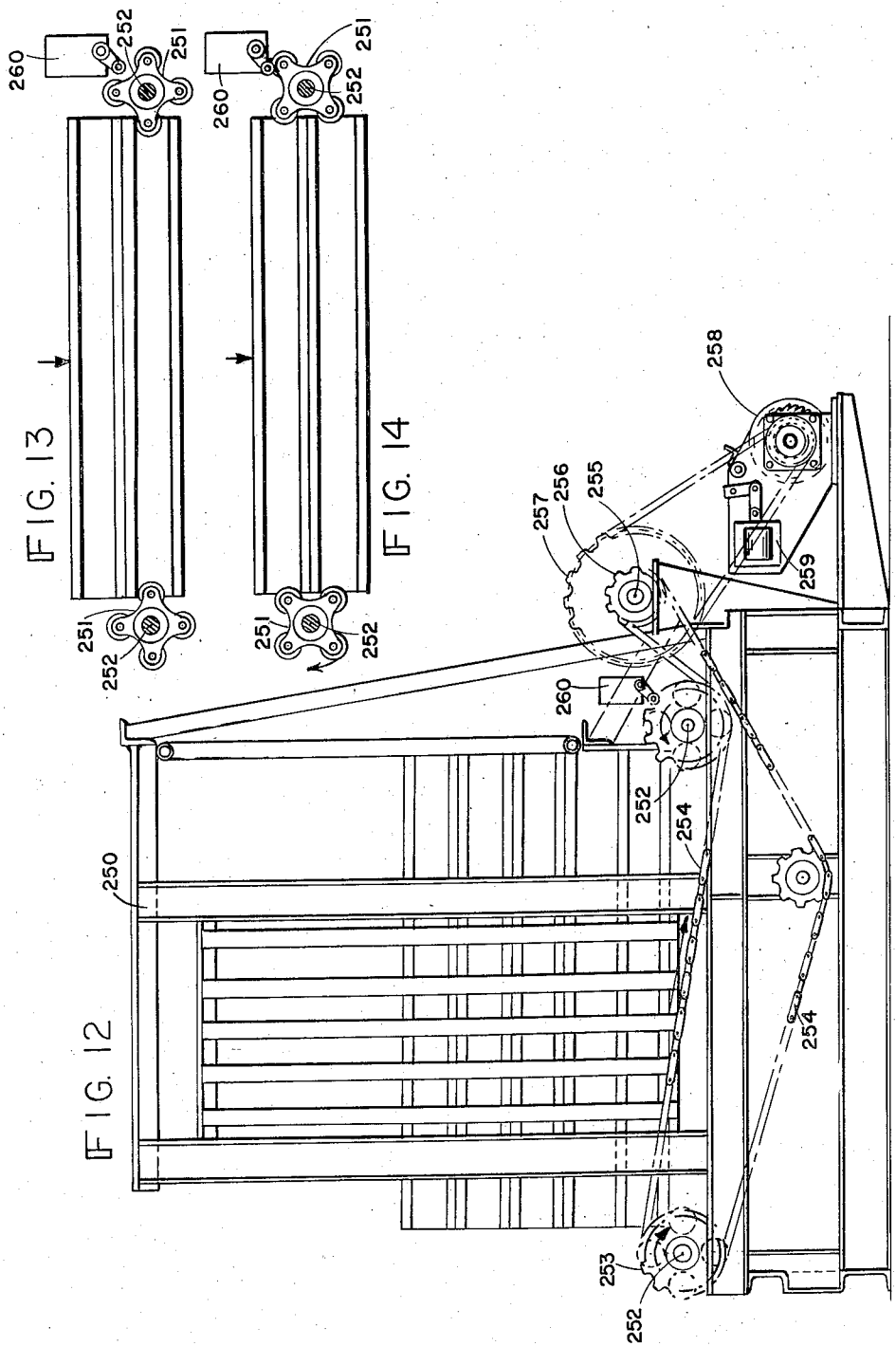

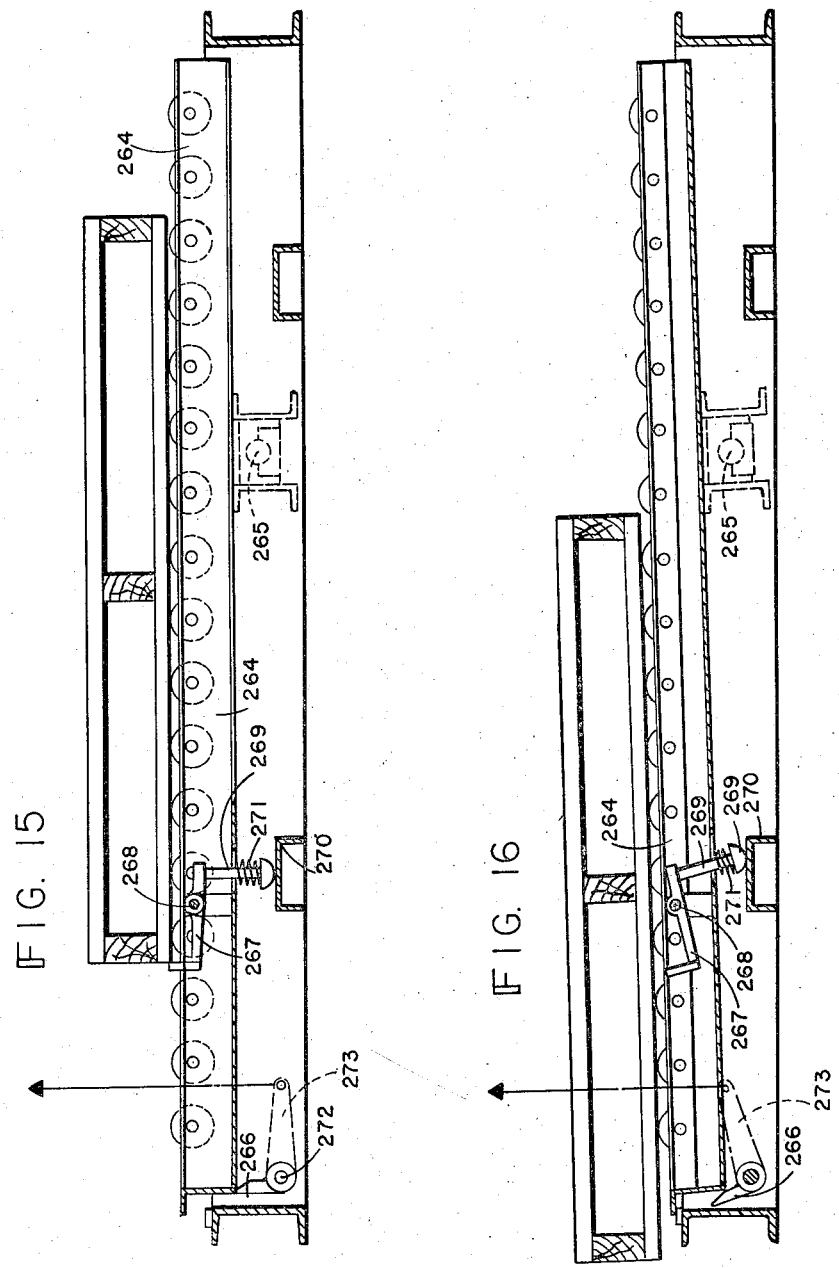

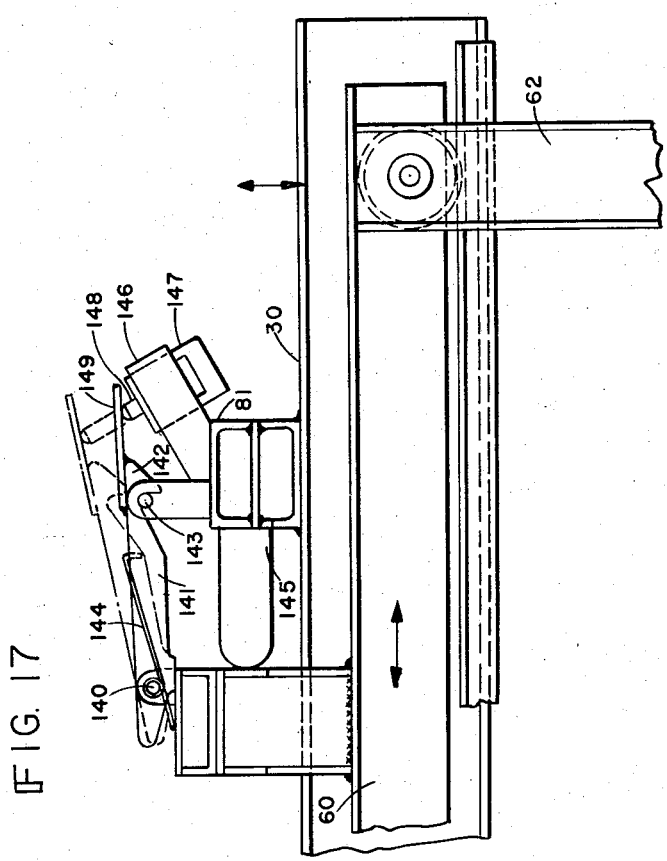

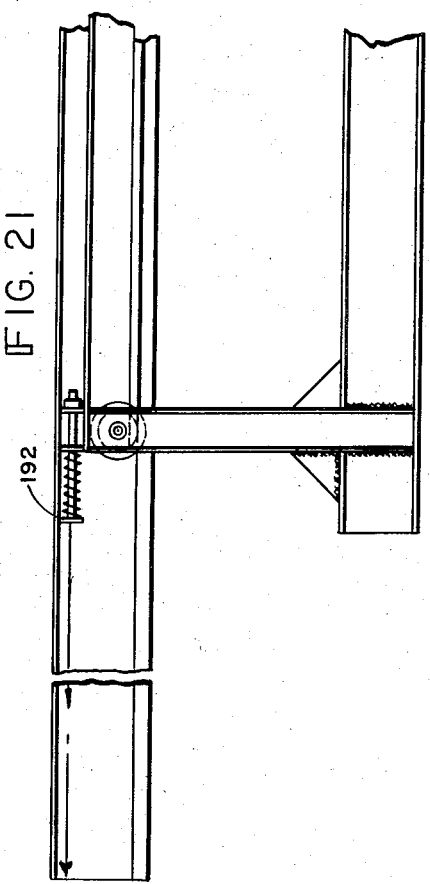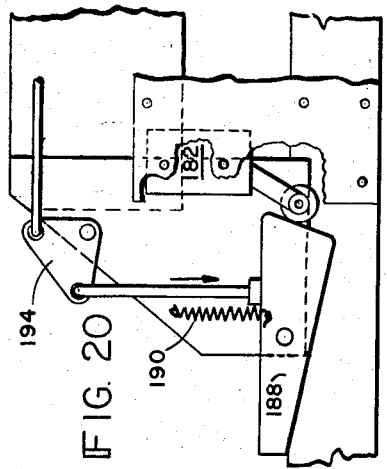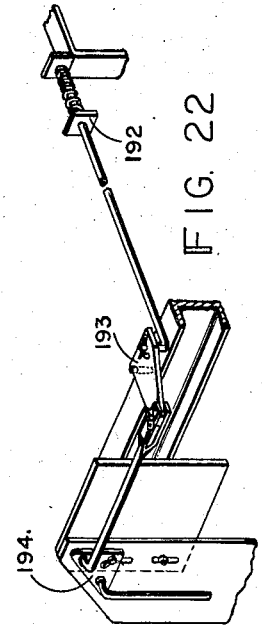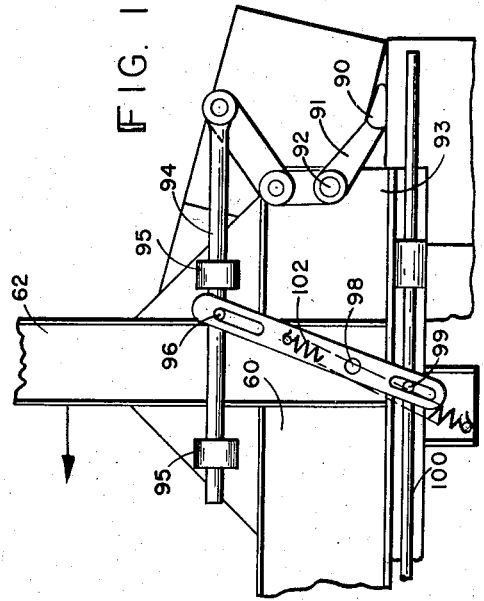

2,875,907

APPARATUS FOR LOADING UNITS

Burton H. Locke, Framingham, and Joseph J. Convers, Rockport, Mass., assignors, by mesne assignments, to J. W. Greer Company, Wilmington, Mass., a corporation of Massachusetts Application July 22, 1954, Serial No. 445,142

13 Claims. (Cl. 214—6)

This invention relates to material handling apparatus and has for its primary object the production of automatic apparatus for vertically superimposing multi-unit horizontal layers of goods one upon another to provide a multi-tiered stack of multi-unit layers deposited preferably upon an underlying support such as a pallet, skid or the like. In its specific aspect, the apparatus comprises a pallet loading machine which is automatic from the point of disposition of individual units, as of packaged goods, in side by side relation at a layer feeding station, and of a stack of pallets at a pallet feeding station, to the point of delivery of a complete palletized load.

It is a particular feature of this invention that the pallet remains stationary while the layers are stacked thereupon one after another. Consequently the load receiving pallet, which has no vertical or other motion during the loading operation, may be positioned near the floor throughout the operation and the in-feed may be at a convenient distance from the floor. No overhead structure nor sub-floor installation is required and hence, in a broad sense, the apparatus is portable in that it need not be tied in with any permanent overhead or sub-floor conveyor, supporting or operating installations. The stationary-while-receiving-the-load feature is thus retained from the apparatus shown in Cahners Patent No. 2,598,-222; however, all the overhung structure of that patent is eliminated.

Essentially, the machine in each cycle takes preformed layers of units such as cartons in succession and piles them successively onto a pallet by feeding them in horizontally over the pallet and depositing them on the pallet or on a previous layer, each layer being fed in over the pallet in a substantially horizontal direction at a level determined, before the horizontal feeding commences, according and close to the level of the surface which will receive the particular layer being fed, and being deposited from that level onto the pallet or its partial load. To this end the machine includes a unit receiving station, a layer receiving station, a layer leveling mechanism, feeding mechanism for feeding a leveled layer over the load tiering station, a layer depositing mechanism and automatic cyclic controls for controlling the leveling mechanism to feed a predetermined number of successive layers of units at successively different levels to complete the load returning the layer supporting element to the layer receiving station between each feed. Additionally, the machine is cycled to automatically eject a loaded pallet upon completion of the deposit of the layers and position another pallet from a pallet reservoir into load receiving position responsive to the ejection of a preceding loaded pallet. Thus loading of a series of pallets may be continued from a steady Indian file feed of cartons to the apparatus.

The operation of the machine and the objects of the invention may be better understood in connection with a complete description which will be given in connection with the drawings wherein:

Fig. 1 is a diagrammatic plan view of the apparatus showing the horizontal spacing of the various stations incorporated in the apparatus;

Fig. 1a is an elevational view on a reduced scale diagrammatically illustrating the operation of the apparatus;

Fig. 2 is a sectional elevational view of the rear half of the apparatus;

Fig. 3 is a fragmentary elevational view on an enlarged scale showing in greater detail certain parts included in the rear half of the apparatus;

Fig. 4 is a fragmentary section taken along the line 4—4 of Fig. 3;

Fig. 5 is a rear elevational view of the apparatus;

Figs. 6, 6a, 6b and 6c are detailed views showing in particular the group stripping mechanism; Fig. 6c being a cross-section taken along the line 6c—6c of Fig. 6a;

Fig. 9 is a horizontal cross-section of the rear portion of the machine showing the carriage in the position of Fig. 3;

Figs. 10, 11 and 11a are fragmentary details showing the operation of the depositing or fence mechanism;

Fig. 12 is a fragmentary side elevational view of the pallet stacking station;

Figs. 13 and 14 are fragmentary details illustrative of operation of the pallet feeding mechanism;

Figs. 15 and 16 are detailed views showing the operation of the pallet positioning and ejecting means;

Fig. 17 is a fragmentary detail showing the carriage locking and releasing mechanism;

Figure 23:
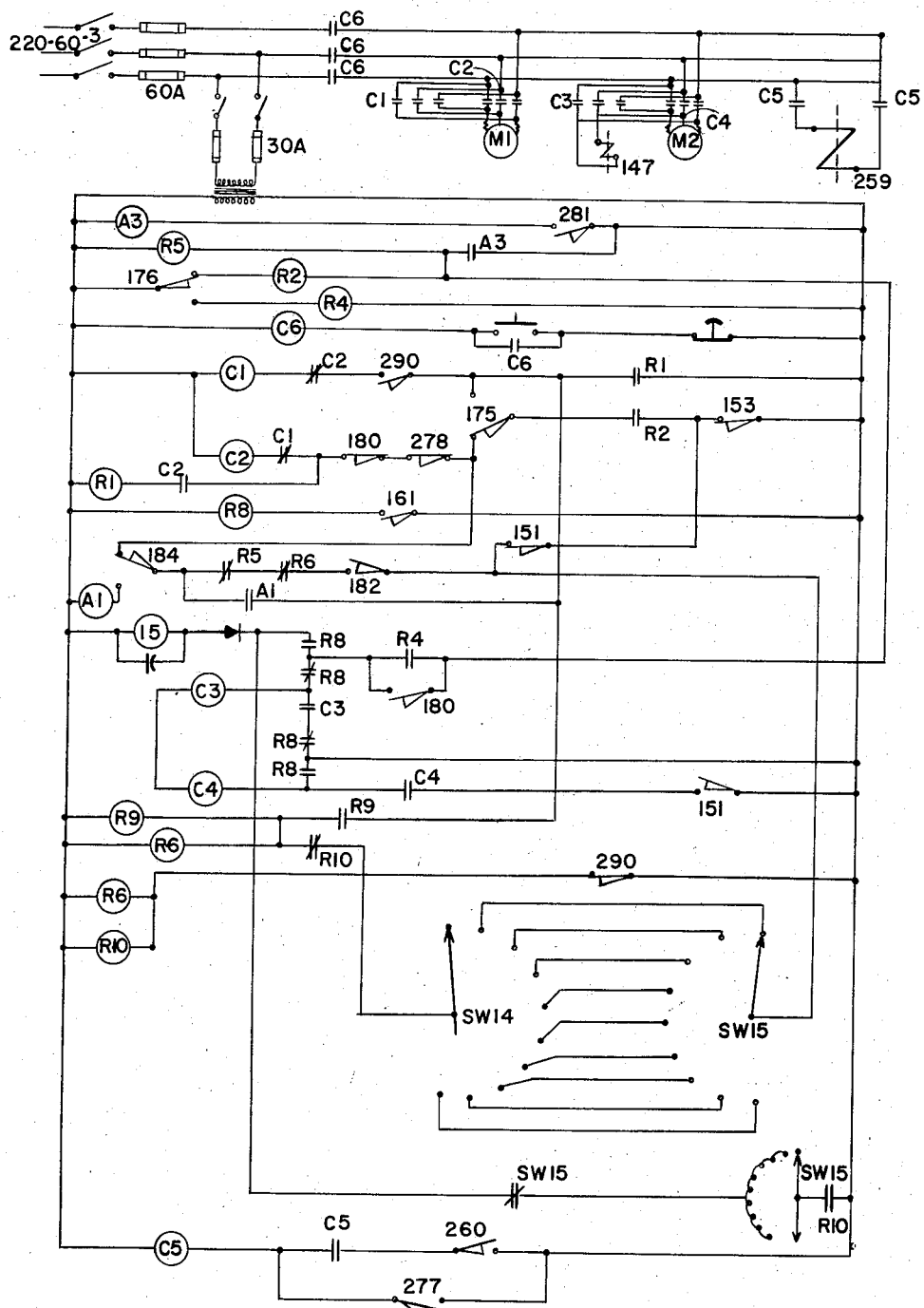

Figs. 18–22 inclusive are details of the elevator leveling mechanism;

Fig. 23 is a circuit diagram.

As shown in Fig. 1, the apparatus when installed may include the output end of a roller conveyor section A which may be inclined so as to feed cartons by gravity onto a similarly inclined ball table similar to the ball table shown in Patent No. 2,598,222 and comprising a box arranging table B. An operator who stands at the left as shown in Fig. 1 of the ball table B may conveniently arrange a group of boxes in side-by-side relation thereon, for which purpose the side of the ball table may be provided with a stationary guard. A row of boxes so arranged in side-by-side relation is then pushed manually by the operator onto an inclined roller conveyor unit C which is provided at its inner end with an upstanding stop roll 20.

Beyond the inner end of the roller conveyor C is the main frame of the machine which incorporates first a group unit receiving station D, occupied cyclically by a tilted roller support; and beyond that the load tiering station E, whereat pallets fed in from the bottom of a stack of pallets held at pallet supply station F can be positioned for loading.

The arrow at the lower right of Fig. 1 indicates the direction of ejection of a loaded pallet from the mechanism.

If desired, the roller conveyor C, in addition to its tilting toward the group receiving station D, may and preferably does have a bias as shown in Fig. 1a, to merge down into a strictly horizontal conveyor at the output end.

The stop roller or gate 20 is vertically movable so that it may be manually lowered below the level of the other rollers on the conveyor C to initiate gravity advance of a layer of units into the remainder of the machine.

Figure 8:
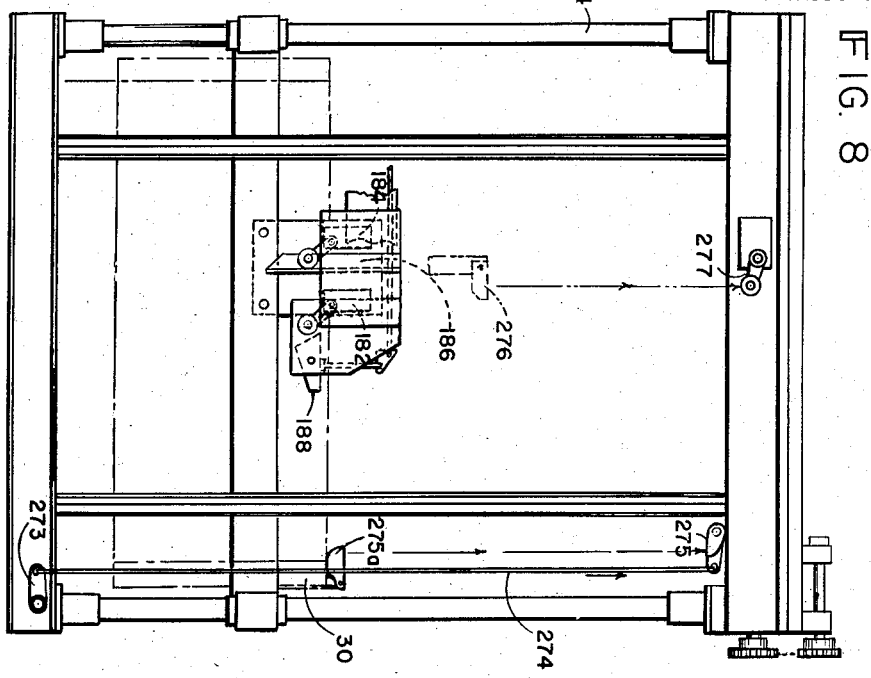
Fig. 8 is a fragmentary elevational view of the rear frame of the apparatus viewed from the inside of the machine.

The back portion of the machine which is shown in greater detail in Figs. 5 and 8 includes a rectangular frame comprising upright posts 24 held in spaced relation by suitable channels 26 at the bottom and at the top.

Figure 7:
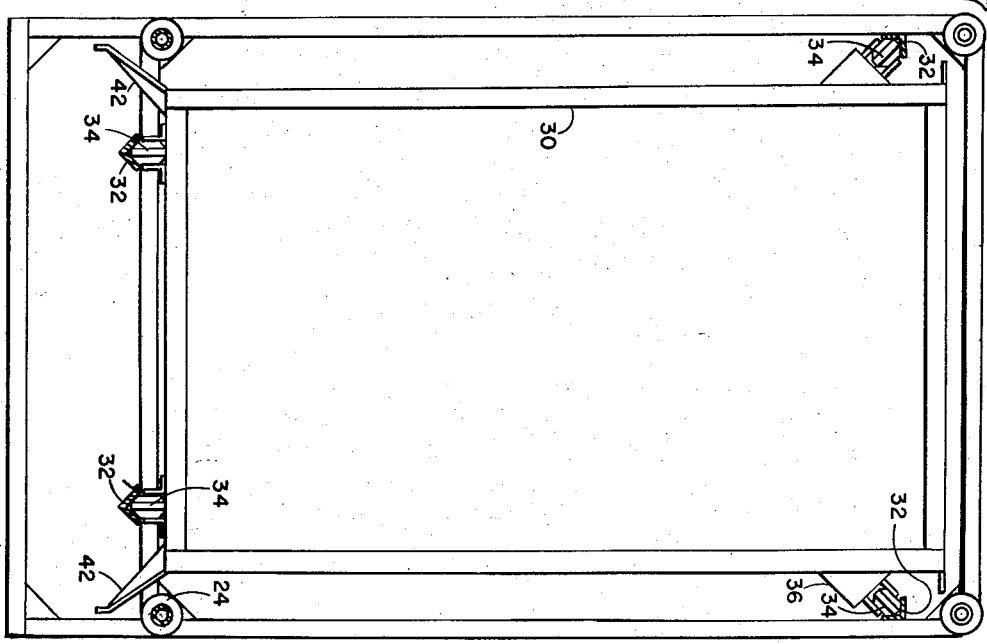
Fig. 7 is a horizontal sectional view, with parts omitted, of the elevator which is included in the rear half of the apparatus.

As shown in Fig. 7, an elevator 30 is suspended within the frame for vertical motion relative thereto, being guided in its vertical motion by a box-like arrangement of four angle irons 32 fast on the frame and against which bear bevelled wheels 34 mounted in brackets 36 fast on the elevator frame 30. The elevator is suspended by four sprocket chains, one at each corner of the frame, which pass over sprockets 40 and 41 and whose free ends fall inside of the corner tubular posts 24.

As shown in Fig. 2, the rear sprocket chains are mounted outside the frame whereas the front sprocket chains are mounted inside the frame so that the rotation of the sprockets 40 and 41 in the same direction will cause an even amount of lift or fall of the elevator 30. Thus, the elevator as shown in Fig. 7 has two rearwardly extending brackets 42 to which the sprocket chains are attached at 43, whereas the front sprocket chains are attached to the elevator 30 at the points 44 shown in Fig. 2. The shaft 42a on which the rear sprockets 41—41 are mounted bears at its left hand end as shown in Fig. 5, another sprocket pulley 45 which is connected by a sprocket chain 46 over a central idler sprocket 47 to a similar sprocket 48 mounted on the same shaft 49 that carries the two front sprockets 40. Accordingly, the two shafts 42 and 49 can be driven in identical directions and with equal speed by reason of their inter-connection by sprocket chain 46. Such drive originates from an electric brake motor 50, shown in Fig. 5, mounted at the rear of the machine, through a gear reduction box indicated generally at 52 and double sprocket chains 54 connecting the reduction box with sprocket pulleys 56 fast on shaft 42a.

Carried by the elevator is a carriage 60 shown in the lower left hand corner of Fig. 2, being suspended on four arms 62, one of which is shown in more detail in Fig. 10. The upper ends of the arms 62 carry inwardly extending brackets 64 which support bearings 66 for flanged carriage wheels 68 which lie on tracks 70 formed by the channels of the elevator 30 in such manner that the carriage 60 may move towards the back of the machine and back again in reciprocal motion relative to the elevator 30.

In order to move the carriage 60 from its left hand position as shown in Fig. 2, to its right hand position as shown in Fig. 6, it is provided with transverse beam 72, the front and rear of which are connected at 72 and 74 respectively by endless cable and sprocket chains diagrammatically indicated at 75 which pass over front sprockets 76 and rear pulleys 77 at the sides of the machine, the front sprockets 76 being carried near the ends of a shaft 78 shown in plan in Fig. 9. The shaft 78 is connected to a reversible motor 80 mounted on a transverse beam 81 of the elevator by inter-connecting sprocket and chain linkage indicated generally at 82 in Fig. 9.

Operation of the motor 80 in reverse directions will thus move the carriage 60 to and fro.

*Fence mechanism (Figs. 3, 4, 10, 11, 11a)*

The carriage 60 also bears at its rear extremity a pivoted horizontally extending fence member 90 which is normally in an upstanding position as shown in Figs. 2 and 3 and having the purpose of stopping and retaining a layer of boxes fed onto the inclined conveyor roller supporting surface of the carriage 60 until such time as it is desired to permit their movement off of said roller carriage as will be hereinafter described.

In order to retain the fence 90 in this upstanding position, it is mounted between two bell crank levers 91 pivoted at 92 on brackets 93 fixedly connected to the carriage 60, all as shown in Figs. 3, 10 and 11.

The other end of the bell crank lever 91 is linked as shown in Fig. 3 to a horizontally extending rod 94 carried by two spaced brackets 95. The rod 94 carries a pin 96 which engages a toggle lever 97 by a slotted connection. The toggle lever 97 is pivoted on carriage 60 at 98 and its bottom extremity engages, with a slotted connection, pin 99 carried by a lower longer horizontally extending rod 100 also carried in brackets 101 extending from the carriage 60. A spring 102 holds these fence operating parts in the position shown in Fig. 3 until they are mechanically operated during the terminal portion of the movement of the carriage 60 over the tiering station. The fence 90 is lowered into the position shown in Fig. 6 by reason of the engagement of a stop 103 shown in Figs. 4 and 11 carried by the lower rod 100 with a vertical abutment 104 fast on the inside of the central side frame post 24. Such engagement stops the motion of rod 100 with carriage 60 to the right as shown in Figs. 3 and 4, thereby pivoting the toggle lever 97 about its pivot 98, throwing the rod 94 rearwardly of the machine to rotate the bell crank lever 91 in clockwise direction to lower the fence to the position shown in Figs. 6 and 11a.

The fence is reset to the position shown in Fig. 3 upon terminal return motion of the carriage 60 by engagement of the front end of the rod 100 with a vertical angle iron stop 105 shown in Figs. 4 and 6.

*Stripper mechanism*

The stripper mechanism is shown in Fig. 3 and in more detail in Figs. 6a, b, c. It is shown in the down operative position in Figs. 6 and 6b and in the up inoperative position in Figs. 3 and 6a.

It includes a horizontal roller 110 mounted at the extremities of arms 111 which are pivoted on stub shafts 112 journaled in the elevator frame 30. The roller 110 is kept in its counter-clockwise lower position of Figs. 6 and 6c under the influence of springs 113 which extend between fixed points 114 near the rear end of the elevator 30 and the rear ends of toggle links 115, which links are pivoted at 116 to ratchet housings 117, which rotate with arms 111 about shaft 112.

Also mounted on shafts 112 for oscillation independent of arms 111 are actuating arms 118 carrying at their extremities rollers 119 which in the upper positions shown in Fig. 3 lie in the horizontal paths of movement of abutments 120 adjustably fixed (Fig. 3) on the inside of front legs 62 of the carriage 60.

The ratchet housings 117 carry attached at a point above the shafts 112 on sheaves additional cable attached springs 121 which are weaker than the springs 113 and which are interposed in the line of cables 122 which extend around idler pulleys 123 journaled on the inside of the elevator 30. The other ends of the cables 122 are connected at 124 to the actuating arms 118.

Thus when the arms 118 are in the right hand position as shown in Fig. 6 and maintained there by the influence of springs 113 because the pivot points 116 are below dead center, the rollers 119 are in the terminal path of return movement of abutments 125 which extend rearwardly from the rear legs 62 of the carriage. Arms 111 fast in ratchet housings 117 have extensions 126 which carry stops 127 which lie in the path of counter-clockwise rotation of the arms 118. Hence, as abutments 120 move to the right, they carry rollers 119 from the position of Fig. 6a to the position of Fig. 6b, but rollers 119 are free to move back to the left independent of the arms 111 away from stops 127. As they so move upon return of the carriage abutments 123, the arms 118 load the springs 121, but housings 117 are held against return movement by the engagement of pawls 128 in ratchet pinions 129 (Fig. 6b) fast on the housings 117, until the pawls are pivoted out of such engagement by cables 130 operating over pulleys 131 under the influence of dogs 132 (Fig. 3) on carriage 60 engaging stops 133 fast on rods 134 carried in brackets 135 on elevator frame 30 and connected to cables 130. Such positive disengagement causes loaded springs 121 to rotate housing 117, attached pinions 129 and stripper roller 110 to its inoperative position at an exact point in the carriage return motion, near the end of such return motion. The pawl re-engages the ratchet as the stripper roller is brought to operative down position on the next cycle.

Carriage locking mechanism

In order to be assured that the carriage 60 does not reciprocate on the elevator 30 except at the desired times, and particularly to prevent it from moving to the rear as boxes are fed onto its forward section from the roller conveyor section C, a locking mechanism is provided, as shown in more detail in Fig. 17 and in plan in Fig. 9. The transverse beam 72 of the carriage 60 has mounted thereon a pivot 140 which carries a locking lever 141 in the form of a latch having a beveled surface 142 and which is adapted to engage a fixed horizontal pin 143 mounted on and above the top of transverse elevator beam 81. The latch 141 is urged into normal horizontal position as shown in Fig. 17 by a spring 144 so that as the carriage 60 returns, the latch 141 on the carriage will automatically by reason of beveled surface 142 pass over and engage the pin 143.

Fig. 17 also shows a rubber bumper 145 to aid in eliminating a jarring stop as the carriage returns.

In order at the proper time to release the latch 141, the elevator beam 81 carries on a bracket 146 a solenoid 147 having its operating plunger 148 so positioned as to engage a forward extension 149 of the latch 141.

The top transverse carriage beam 72 also carries an abutment 150 shown in Fig. 9 for engagement with a limit switch 151 mounted on the elevator beam 81 and a second abutment 152 for engagement with another limit switch 153 also mounted on the transverse elevator beam 81. These switches as will be hereinafter described are one, for the purpose of stopping the return carriage movement, and the other for the purpose of initiating the vertical operation of the elevator to the group receiving or infeed level upon the return of the carriage to locked position relative to the elevator.

The mechanism for reversing the motion of the carriage 60, after it has moved over the load tiering station, includes a cam 160 (Fig. 3) carried on the transverse carriage beam 72 and adapted to engage a limit switch 161 mounted on the elevator frame at a suitable distance from the rear of the machine to limit the travel of the carriage 60.

The carriage motion, after being initiated is thus automatic through the operation of the limit switch 161 reversing the carriage motion for return until it is stopped by the limit switch 153. Switch 161 also acts to send impulses to a stepping switch to count the reciprocations of the carriage, as will be hereinafter described.

Elevator leveling mechanism

The mechanism for bringing the elevator 30 to the proper level for unloading of the carriage is shown in Figs. 2, 3, 18 and 19.

Fig. 1 shows the roller supporting surface of the carriage 60 at a group receiving or infeed level in the plane of the level of the innermost roller 21 of the conveyor unit C.

Figure 19:
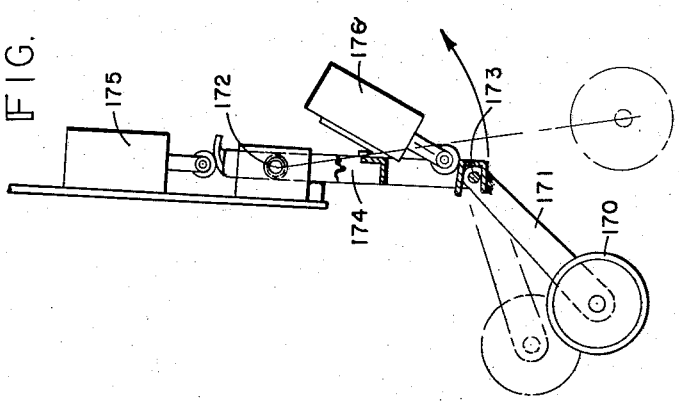
Figure 18:
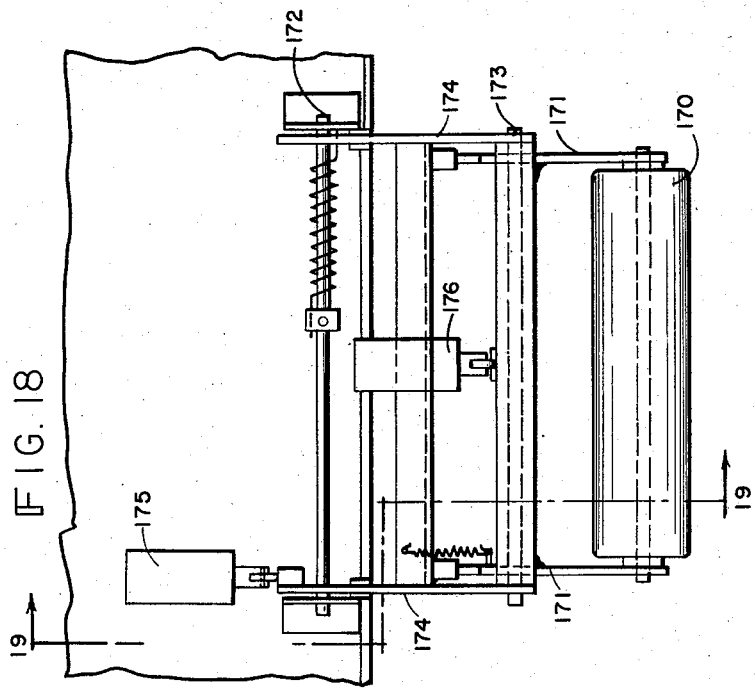

Movement of the elevator from this position to a series of different levels, depending upon the level at which the next layer on the carriage is to be unloaded at the tiering station, is controlled by sensing mechanism which is suspended from the elevator on the inside of the rear frame of the machine. A roller 170 is suspended on an articulated linkage, the lowermost arms of which 171 are shown in Figs. 2 and 19 at the limit of their forward movement about upper pivot 172, but they can have additional clockwise rotation from the position shown in Fig. 2 about a lower pivot 173 to the dotted line position of Fig. 19. Moreover, in the Fig. 2 and 19 position, roller 170 is at its rearward limit of rotation about 173 but may have counter-clockwise motion about its pivot 172 to the rearward position shown in Fig. 3, and in dotted lines in Fig. 19.

Pivoting of the upper arms 174 towards the rear of the machine causes operation of a switch 175 whereas pivoting of the lower arms 171 in the opposite forward direction actuates a switch 176.

When the layer of boxes shown in Fig. 2 is carried to the right by the carriage 60 to the position shown in Fig. 3, the forward wall of the boxes will have moved the roller 170 rearwardly from its Fig. 19 full line position to its Fig. 19 dotted line position about the upper pivot 172.

After the return of the carriage, therefore, to the group receiving station D where it picks up the second layer, the elevator will rise, if the roller 170 is still held in its rearward position, about pivot 172 by a previously loaded layer, as indicated in Fig. 3, carrying with it the roller 170 until the roller clears the top of the layer of boxes shown in Fig. 3, at which time the roller will move forwardly in the free space over the layer of boxes about the upper pivot 172, thus actuating switch 175 to reverse the motion of the elevator and start it downwardly again. As it moves downwardly, however, the roller 170 comes into pressure engagement with the top of the box layer and then pivots clockwise around the lower pivot 173, which, because of the switch 176 causes the elevator to come to a stop. This operation occurs with the positioning of each successive layer of boxes within the height limit of the machine so that the leveling of the elevator to successive higher levels after the positioning of the first layer of boxes is automatically controlled. Prior to the positioning of the first layer, roller 170 is in its forward position about pivot 172 which causes the elevator to descend. However, the first elevator loading level is almost always a constant, so that, instead of relying on actuation of the switch 176 to stop the down motion, a switch 180 mounted on the machine frame at the front (Fig. 2) is utilized at a level higher than the position of the elevator which would cause roller 170 to touch the pallet.

After each return of the carriage 60 from its position over the pallet tiering station, it is necessary that the elevator return to the level at which it receives the next layer of boxes from the conveyor C. For this purpose, there is included an automatic elevator leveling mechanism which is operative only when boxes are not on the carriage.

Thus, as shown in Fig. 8, which is an inside view of the rear of the machine, there are two limit switches 182 and 184. The switch 184 lies in the path of a cam 186 carried on the elevator frame 30. The actuating surface of the cam 186 is so related to the switch 184 that it causes downward elevator motion when the elevator is above the desired level, and upward motion when the elevator is below the desired level.

The switch 182 lies in the path of a second pivoted cam 188 shown in Fig. 20, which actuates the switch 182 only on a downward motion to cause the elevator to come to a stop. In returning to its in-feed level, therefore, the elevator 30 always goes to a level above the infeed level, reverses and comes to a stop on its downward motion by the operation of the stopping switch 182 at the infeed level.

It is necessary, however, under certain circumstances to move the cam 188 out of engagement with the stopping switch 182 so that it will not prevent vertical motion of the elevator when the carriage returns. For this purpose, every time the carriage moves to the back of the machine, a dog 192 (Fig. 21) carried on the rear of the carriage, trips a linkage, generally indicated at 193, 194 in Figs. 20 and 22, to cause cam 188 to pivot clockwise as shown in Fig. 20 to a vertical position, so if the level of the elevator at that time is such that the cam 188 is in actuating engagement with the switch 182 the cam will be moved below the switch roller so that switch 184 can take over when the carriage returns.

The purpose then of the tripping mechanism 192 and 194 is to insure that if the unloading level is not very far away from the infeed level so that cam 188 and switch 182 will not be disengaged by the small vertical motion of the elevator from the infeed level, they will surely be disengaged by the forward motion of the carriage and thus permit vertical elevator motion controlled by reversing switch 184 when the carriage returns at that near level. If the unloading level of the elevator is far enough above or below the infeed level, the elevator motion disengages cam 188 and switch 182; the trip mechanism 192, 194 then operates idly on each carriage motion, since spring 190 will reset cam 188 when the carriage returns.

*Pallet feeding mechanism*

Pallet supply station F comprises hollow frame work 250 which is open on the rear in order to permit the positioning of a stack of pallets.

Because of the open ended construction of the pallets it is possible for the lowermost of a stack to be held in suspended engagement by pairs of opposed star wheels 251 shown clearly in Fig. 13 and carried on parallel shafts 252, having at their outermost ends, sprocket gears 253 which are engaged by an endless sprocket chain 254 which in turn engages a shaft 255 through a sprocket 256 and thereby has connection through a larger sprocket 257 also mounted on the shaft 255 with an electric brake 258 which has sufficient braking power to retain the star wheels in fixed position supporting a stack of pallets until the brake mechanism is periodically released through the action of a solenoid 259 to permit revolution of the pairs of star wheels 251 in opposite directions to drop the lowermost pallet after adjacent rollers on the star wheel have passed into the next pallet to interrupt the dropping motion of the remainder of the stack. A switch 260 (Fig. 13) is provided which is engaged by the following roller on one of the star wheels 251 to actuate the solenoid 259 to apply the electric brake again, thus limiting each periodic motion of the shafts 252 to a Geneva-like 90° revolution.

As shown in Fig. 5, when the star wheels thus release a single pallet, it falls onto a tilted roller conveyor 261 from which it rolls into the pallet tiering station E.

The bottom of the pallet tiering station comprises a roller surface with the rollers extending at right angles to the direction of the rollers on the carriage 60 and, as shown in Figs. 15 and 16, the frame 264 for the rollers is eccentrically mounted on trunnions 265. The frame 264 is supported in horizontal position by a bell crank trip release 266 which lies beneath the left hand end of the frame 264. This trip is movable from its Fig. 15 position as shown in Fig. 16 to drop the left hand end of the frame 264 under the influence of gravity for the purpose of ejecting a loaded pallet at the proper time. The frame 264 is also provided with a pallet receiving stop 267 which is pivoted at 268 to the frame 264 and has a downwardly extending pin 269 which rests against a stop 270 on the bottom of the machine. Between the end of the pin 269 and the bottom of the frame 264 is a spring 271 which tends to hold the pallet stop member 267 in its position extending above the rollers; but when the frame 264 tilts downwardly under the influence of gravity, upon release of trip 266, engagement of the pin 269 with the stop 270 causes counterclockwise rotation of the stop member 267 to lower it out of the path of the pallet to be ejected. This clears the tiering station for the entry of the new pallet which comes in on a gravity feed after the frame 264 is returned to horizontal position. The pallet is thus stopped against the pallet stop member 267.

The trip 266 for loading frame 264 is carried on a shaft 272 (Fig. 2) which is connected by a link 273 to a vertical connecting rod 274 which extends to the top of the machine and is connected to a trip 275, which is in the path of movement of a dog 275a (Fig. 8) on top of the elevator 30 (Fig. 8).

As will be hereinafter described, after a predetermined number of layers, counted through carriage reversing switch 161, have been deposited on the pallet, the elevator 30 rises to the top of the machine, so that the load on the pallet can clear the machine as the pallet is ejected, and for the purpose of tripping trip 275 to permit ejection of the loaded pallet. The rise of the elevator to this position also has two other purposes, first, as shown in the middle of Fig. 5, the elevator carries a dog 276 which has a path of movement to engage a switch 277 at the top of the machine for the purpose of releasing the brake mechanism 258 of the pallet feeding station F. Its last purpose is to reset the machine for a new cycle as will be later described.

As shown in Fig. 2, a switch 278 is also provided beneath the tiering station shown in Figs. 2, 3 and 4, for engagement by a dog 279 fast on the frame 264. The purpose of the switch 278 is to defer the down motion of the elevator until after the pallet has been ejected from the station E. The pallet supporting frame 264 is returned to horizontal position by the springs 280 to release switch 278 and permit the trip support 266 to reset itself as soon as the elevator starts downwardly.

In addition to the switches already mentioned, Nos. 151, 153, 161, 175, 176, 260, 277 and 278, there are two more. One of these, 281, shown at the bottom of Fig. 1 is actuated by the movement of a gate 282 which extends over the conveyor surface of the carriage 60 in the path of movement of an entering row of boxes. Actuation of the switch 281 is a prerequisite to the initiation of the cycle. This switch also controls the use of one elevator levelling circuit if boxes are on the carriage (i. e. the load levelling circuit containing switches 175 and 176) and a different elevator levelling circuit if boxes are not on the carriage (i. e. the infeed levelling circuit containing switches 182 and 184). The micro switch 290 shown at the left in Fig. 2 at the top is a reversing limit switch for the upward vertical motion of the elevator.

*Electrical circuits (Fig. 23)*

The circuit diagram of Fig. 23 shows near the top, as the main control, the switch 281 which is actuated by the advance of boxes on to the carriage 60. Closing of this switch energizes a time delay relay A3. A sufficient time is allowed for the cartons or boxes to come to a complete stop on the carriage, then contacts A3 close the circuit to relay R5. If the switches 175 and 176 are in the position shown in Fig. 19, corresponding to the normal or relaxed position of roller 170, R2 closes a circuit to the down coil of the elevator motor contactor. The elevator then proceeds downwardly until it actuates limit switch 180 in the down elevator circuit, opening this circuit. At the same time, through additional contacts of switch 180, a carriage motion circuit to the forward coil C3 of the carriage motor contactor is closed, thus starting the motor and simultaneously releasing the latch through solenoid 147. The carriage motion continues on until the limit switch 161 closes, energizing a relay R8. Three of the contacts R8 act to de-energize the circuit to C3 and close the circuit to C4, thus reversing the carriage. The fourth contacts R8 close a circuit through a selenium rectifier to the direct current coil of stepping switch 15, causing this switch to index one position.

As the boxes are stripped off the carriage the switch 281 is opened, de-energizing relay R2 and cutting out the leveling circuit of switches 175 and 176.

The reverse carriage motion is interrupted by the opening of switch 151 in the C4 circuit.

As indicated in Fig. 23, switch 151 is a two-circuit switch which, in addition to being in the reverse carriage circuit C4, is also in an up-elevator circuit C2 along with switches 182 and 184, which latter circuit becomes closed as the carriage arrives at the return position. The arrival of the carriage at return position thus closes switch 153 which makes a circuit also through switch 151, 182, and 184 to the up contactor of the return motion leveling mechanism. This up circuit remains closed until the switch 184 closes the circuit to the down contactor. However, because a time delay, A1, is inserted in the up circuit, the contacts A1 will remain closed for a fraction of a moment after the closed circuit for the down motion is made and hence the elevator will not immediately reverse but will overshoot until the time delay has elapsed and contacts A1 reopen. The down circuit remains energized until the switch 182 is opened to stop the elevator at the assembly level position.

The virtue of a time delay A1 is therefore that the elevator will always approach the infeed level from above.

As the next layer of boxes comes onto the carriage the switch 281 will again be actuated to start the cycle in the same manner as before except this time the switch 175 may be closing the up elevator circuit. The elevator rises until roller 170 rolls onto the top of the load, causing the elevator to reverse and start downward.

The switch 176 will break the normal leveling circuit when there is pressure engagement of the roller 170 with the top of the box so that the level will be sensed always from above. The relay R4 is included in order to close contacts R4 in the forward carriage circuit when the switch 176 is in the down position, indicating that the elevator has reached the proper level and the carriage may operate.

The relay R1 is included in a parallel down elevator circuit so that the contacts R1 will be actuated every time the coil C2 is energized through the closing of the contactor C2. The relay R1 will close contacts R1 in a parallel up elevator circuit until C2 is de-energized, whereupon the contacts C2 open to open R1 after the predetermined delay. Because of the time delay in R1 there will be a momentary energizing of the up contactor of the elevator when C2 is de-energized but its duration is not sufficient to move the elevator. In reality, it is only to provide a rapid stop using the up coil as a brake.

Normally closed contacts C2 and C1, actuated by motor coils C2 and C1 respectively, prevent the up and down contactors from being energized simultaneously.

As the carriage reaches its limit of rear movement, switch 161 again operates relay R8 which reverses the carriage and actuates the stepping switch to third position.

Depending upon the manual setting of the selector switch 14, these cycles will be repeated until a circuit is completed through switch 15 and switch 14 and normally closed relay contacts R10 to mechanically held relay R6. Relay R6 opens contacts R6 between switches 182 and 184 to cut out the elevator down circuit. The circuit through selector switch 15 also actuates relay R9 which locks in through contacts R9 an up elevator circuit to carry the elevator to the top of the frame of the machine where, as hereinbefore described, the pallet trip release is mechanically actuated just prior to the actuation of the up limit switch 290. R9 automatically opens contacts R9 upon the opening of the elevator up circuit by the limit switch 290. R10, also in the up elevator circuit, then opens normally closed contacts R10, breaking the circuit through the selector switch 15, and latching relay R6 is simultaneously released to reset the down elevator circuit. Actuation of R10 also closes a circuit through normally open contacts R10 to reset the stepping switch through homing contacts 15.

The pallet clear switch beneath the loading station 278 locks out the down elevator circuit until the roller conveyor of the pallet loading station has returned to horizontal, indicating that the load is clear, whereupon switch 278 will again close the elevator down circuit, releasing the elevator up limit switch 290 and breaking the circuit to R10 and R6 release and allowing the elevator to return to the arranging table position.

The bottom of the diagram shows an additional circuit for the pallet feed which is closed by mechanical actuation of limit switch 277 as the elevator goes to the top. The closing of this circuit closes contactors C5 which lock in this circuit despite the opening of switch 277 until the circuit is broken by star wheel switch 260 to apply the brake mechanism again to the pallet magazine. Normally closed contacts R5 are in the infeed leveling circuit so that whenever boxes are on the carriage so that the switch 281 is closed, these contacts R5 will be open so as to select the tiering station leveling mechanism and cut out the infeed leveling mechanism.

The circuit containing C6 is a start-stop circuit controlling the contactor C6 in the supply line to both motors, so that by use of the start-stop switches in the C6 circuit the machine can be stopped at any place in its cycle without affecting the setting of the relays in the entire control circuit.

*Operation*

As boxes come down the roller conveyor A in a single file they may be arranged in rows on the ball table B and the operator may then start the row of boxes as a unit down the inclined conveyor C where their movement is interrupted by the stop-gate 20. The operator then arranges a second row of boxes and repeats the operation until the desired pattern of a layer of boxes is formed on the section C.

If a pallet has been previously properly positioned at the tiering station E against the stop 267, the operator then manually lowers the stop gate 20 and the layer proceeds by gravity onto the carriage D. As it reaches the fence 90, the gate 282 is operated which after a time delay, causes brake motor 50 to drop the elevator downwardly until it is stopped by actuation of the elevator down limit switch 180. Simultaneously, the carriage locking mechanism is released by actuation of the solenoid 149 and the motor 80 starts to move the carriage to the rear. Towards the terminal portion of this motion the fence 90 is lowered and, on the first carriage reciprocation, pushes the roller 170 ahead of it towards the rear of the machine. Also near the terminal motion of the carriage towards the rear of the machine, the stripper mechanism is lowered behind the boxes because of the engagement of the abutment 120 with the stripper actuating roller 119. Lastly, the carriage cam 132 contacts the switch 161 and causes the motor 80 to reverse and return the carriage.

Towards the terminal return motion of the carriage the stripper bar is reset by the abutment 125.

Terminal return motion of the carriage also resets the locking mechanism, stops the carriage motion by actuation of switch 151, and throws in the infeed leveling circuit by actuation of the switch 153.

By reason of the operation of the infeed leveling switches 182 and 184, the elevator is then returned to the level of conveyor C.

Meanwhile, the switch 161 has recorded one carriage reciprocation.

The machine cycle is then interrupted until the next layer of boxes actuates the gate switch 281. This time, however, because the roller 170 is in its retracted position as shown in Fig. 3, the elevator rises and is sensed to the second unloading level by sensing switches 175 and 176.

The operation is repeated for the number of layers for which the stepping mechanism is set, whereupon the elevator rises to its uppermost limit, tripping the pallet release mechanism to eject the loaded pallet, actuating the switch 290 to reverse the elevator motion (after ejection of the loaded pallet), and actuating the switch 277 to cut in the pallet feed circuit to feed another pallet to the tiering station E.

While the pallet is being ejected the switch 278 holds the elevator in its uppermost position but releases it for return to the infeed level as the conveyor frame 264 returns to horizontal position.

As previously stated, the gate switch 281, in addition to initiating the cycle, selects which leveling mechanism is effective. With boxes actuating the switch 281, the unloading leveling mechanism associated with switches 175 and 176 is in control whenever carriage 60 is locked in its forward position; whereas if switch 281 is not actuated by the boxes, the infeed leveling mechanism including switches 182 and 184 is in control.

Having thus described our invention, what we claim is:

1. Apparatus for loading units into multi-tiered stacks of multi-unit layers comprising a load tiering station, a support adapted to receive and support a group of units in side-by-side relation thereon, said support being movable from an initial group receiving position at one level sequentially to a series of differing discharging levels over said load tiering station, means for removing said support from beneath a load resting on said support responsive to the arrival of said support at each discharging level over said load tiering station to drop the load at said tiering station and means for always returning said support to said group receiving position one level after a load has been dropped at any of said discharging levels for receiving each new load on said support at the same level as every previous load.

2. Apparatus for loading units into multi-tiered stacks of multi-unit layers in accordance with claim 1 wherein the means for removing said support from beneath said load includes a limit switch responsive to the arrival of said support at each discharge level over said load tiering station, and wherein the means for always returning said support to said group receiving position one level is automatically actuated upon completion of the dropping of said load support.

3. Apparatus as claimed in claim 1 wherein the means for removing the support comprises a stripper bar and operating mechanism for interposing said bar into the normal path of movement of said group of units with said support as said support moves back to its initial group receiving position and wherein there is a fence mechanism on said support adjacent an edge of said support for retaining units thereon, said apparatus having means responsive to terminal motion of said support to its load discharging position at said load tiering station for moving said fence mechanism from a unit retaining position to a unit unloading position.

4. Apparatus for loading units into multi-tiered stacks of multi-unit layers comprising a load tiering station, an elevator mounted for vertical movement relative to said station, a load supporting surface mounted on said elevator and adapted to receive and support a group of units in side-by-side relation thereon, said surface being mounted for lateral movement relative to said elevator, means for moving said load supporting surface on said elevator from an initial group receiving position at one level to a series of differing sequentially higher discharging levels over said load tiering station and means for moving said load supporting surface laterally of said elevator from beneath a load resting on said supporting surface when said supporting surface is at each discharging level over said load tiering station to drop the load at said tiering station and means for always returning said elevator and said supporting surface to said group receiving position one level after a load has been dropped from said supporting surface at any of said discharging levels for receiving each new load on said supporting surface at the same level as every previous load.

5. Apparatus for loading units into multi-tiered stacks of multi-unit layers comprising a load tiering station, a support adapted to receive and support thereon a group of units in side by side relation, said support being movable from an initial group receiving position at a receiving station at one level adjacent said tiering station to a series of different unloading levels over said tiering station, means for moving said support, after it has reached each said level, over said tiering station and back again to its initial group receiving position at said one level and means for stripping a group of units supported on said support over said tiering station from said support as said support moves back to its initial group receiving position at each of said different levels.

6. Apparatus as claimed in claim 5 wherein the stripping means comprises a stripper bar and operating mechanism for interposing said bar in the normal path of movement of said group of boxes after they are moved over said tiering station on said support.

7. Apparatus as claimed in claim 6, wherein said mechanism operates responsive to terminal movement of said support over said tiering station.

8. Apparatus as claimed in claim 6, wherein said mechanism operates to return said stripper bar to inoperative position responsive to terminal return movement of said support away from said tiering station.

9. An apparatus for loading articles upon a pallet including feed means for supplying a stream of said articles, pallet support means, a loading member mounted for generally horizontal reciprocating movement over said pallet support means, said loading member receiving said articles from the feed means to carry them over the pallet and including a stop member mounted adjacent its forward edge movable to and from an operative position in which it engages the foremost row of articles upon the loading member and an inoperative position in which it is clear of said articles, means for reciprocating the loading member to and from a position over the pallet, and means for stripping the articles from the loading member to form a layer upon the pallet as the loading member is withdrawn from its position over the pallet, said stripping means including a stripper member mounted over said loading member, means for advancing said stripper member in timed sequence with said loading member to engage the rearmost row of articles on the loading member while the loading member is withdrawn from beneath the load and for retracting the stripper member to its original position, and means for maintaining the movable stop member in inoperative position as the loading member is being withdrawn and in operative position as the loading member is being advanced.

10. An apparatus for loading articles upon a pallet including feed means for supplying a stream of said articles, means for supporting a pallet in loading position, a loading member mounted for generally horizontal reciprocating movement to and from a position over said pallet, said loading member receiving said articles from the feed means to carry them over the pallet, means for reciprocating the load member to and from a position over the pallet, and means for stripping the load of articles from the loading member to deposit the load upon the pallet as the loading member is withdrawn from its position over the pallet, said stripping means including a stripper member, and means for advancing the stripper member in timed sequence with the loading member to engage the rearmost row of articles in the load while the loading member is withdrawn from beneath the load and for returning the stripper member to its original position.

11. An apparatus for loading articles upon a pallet comprising feed means for supplying said articles, means for supporting a pallet in loading position, a load carrier mounted for generally horizontal reciprocation to and from a position over the pallet to be loaded, said carrier being adapted to receive articles from the feed means, means for advancing and retracting said carrier, means for stripping articles from the carrier to deposit them on the pallet as the carrier is retracted from its position over the pallet, a stop member mounted adjacent the forward edge of the carrier for reciprocation therewith, said stop member being movable to and from an operative position in which it engages the foremost row of articles on the carrier and an inoperative position in which it clears the articles on the carrier, and means for maintaining said stop member in operative position as the carrier is advanced and for maintaining it in inoperative position as the carrier is retracted.

12. In pallet loading apparatus, a carriage having a supporting surface lying in a plane, a ball table spaced from said carriage and lying in a plane inclined in a direction perpendicular to the carriage supporting surface plane, and a conveyor extending between an inclined side of said ball table and said carriage and having a warped conveying surface connecting the inclined plane of the ball table with said carriage supporting surface plane, whereby articles may be fed from said ball table in a direction perpendicular to its inclination over said warped conveyor to said carriage.

13. In pallet loading apparatus having an elevator and a carriage mounted on said elevator for horizontal reciprocal motion relative thereto to and fro over a pallet loading station, an eccentrically tilting roller conveyor having rollers mounted on parallel axes normal to the path of movement of said carriage at said loading station, means for moving said elevator and carriage, trip mechanism supporting said conveyor in horizontal position during loading and for removing said support for load induced gravity tilting of said conveyor, means responsive to terminal motion of said elevator in an upward direction for tripping said trip mechanism to tilt said conveyor to eject a loaded pallet from said loading station, spring means for returning said unloaded conveyor to horizontal position, and means responsive to the movement of said loading station conveyor to unsupported tilted position to prevent operation of said elevator and carriage moving means while said conveyor remains tilted.

References Cited in the file of this patent

UNITED STATES PATENTS

| | | |
|---|---|---|
| 321,348 | Dunshee | June 30, 1885 |
| 1,095,319 | Erwin | May 5, 1914 |
| 1,129,214 | McIlvried | Feb. 23, 1915 |
| 1,707,144 | Simone | May 17, 1923 |
| 1,778,267 | McArthur | Oct. 14, 1930 |
| 2,204,828 | Sherrill | June 18, 1940 |
| 2,598,222 | Cahners et al. | May 27, 1952 |
| 2,609,108 | Peterson et al. | Sept. 2, 1952 |
| 2,633,251 | Bruce | Mar. 31, 1953 |
| 2,701,650 | Stevenson | Feb. 8, 1955 |
| 2,703,653 | Thomson | Mar. 8, 1955 |